*L. Smith,*

*Bed Spring.*

Nº 55,021.  Patented May 22, 1866.

Witnesses:

Inventor
Lewis Smith
by his Attorney

UNITED STATES PATENT OFFICE.

LEWIS SMITH, OF FOXBOROUGH, MASSACHUSETTS, ASSIGNOR TO HIMSELF AND GEO. T. RYDER, OF SAME PLACE.

IMPROVED SPRING FOR BEDS.

Specification forming part of Letters Patent No. 55,021, dated May 22, 1866.

*To all whom it may concern:*

Be it known that I, LEWIS SMITH, of Foxborough, in the county of Norfolk and State of Massachusetts, have invented a new and useful or Improved Spring for the use of Upholsterers in the Preparation or Construction of Spring-Beds or Cushions of Various Kinds, as well as for various other purposes; and I do hereby declare the same to be fully described in the following specification and represented in the accompanying drawings, of which—

Figure 2:
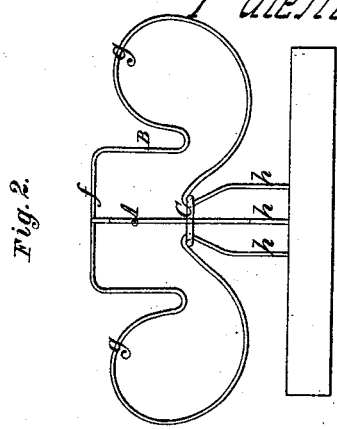
Figure 3:
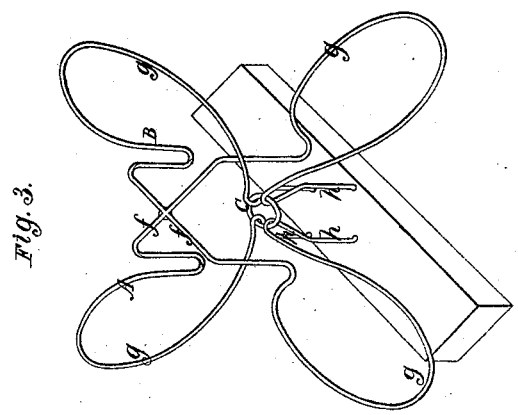
Figure 1:
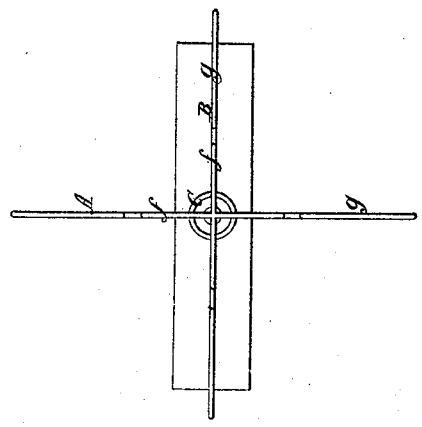

Figure 1 is a top view, and Fig. 2 a side elevation, of the said spring. Fig. 3 is a perspective view of it inserted in a bar or board.

The invention is a compound or duplex spring, or is composed of a ring, C, and two or more springs, A. B, each of the said springs consisting of a piece of wire bent around in the form as shown in Fig. 2. The said two springs are to be arranged at right or acute angles to one another, and may be joined together at their intersection, and are encompassed at or near their middles by the ring, the position of which is as represented.

The middle or flat part, $f\,f$, of each of the springs constitutes a support for whatever may be imposed upon the spring. The wings or parts $g\,g$ are like, and operate very much the same as what are termed "C springs" of a carriage. The legs or parts $h\,h$ are to enter the supporting-board, and are for the purpose of sustaining the springs in position, the ring preventing endwise spreading of them.

I claim—

The duplex spring composed of the ring C and the two springs A B, formed and arranged substantially as described and represented.

LEWIS SMITH.

Witnesses:
R. H. EDDY,
F. P. HALE, Jr.